Sept. 30, 1952     W. R. TRIPLETT     2,612,132
INSTRUMENT COVER
Filed Sept. 15, 1950
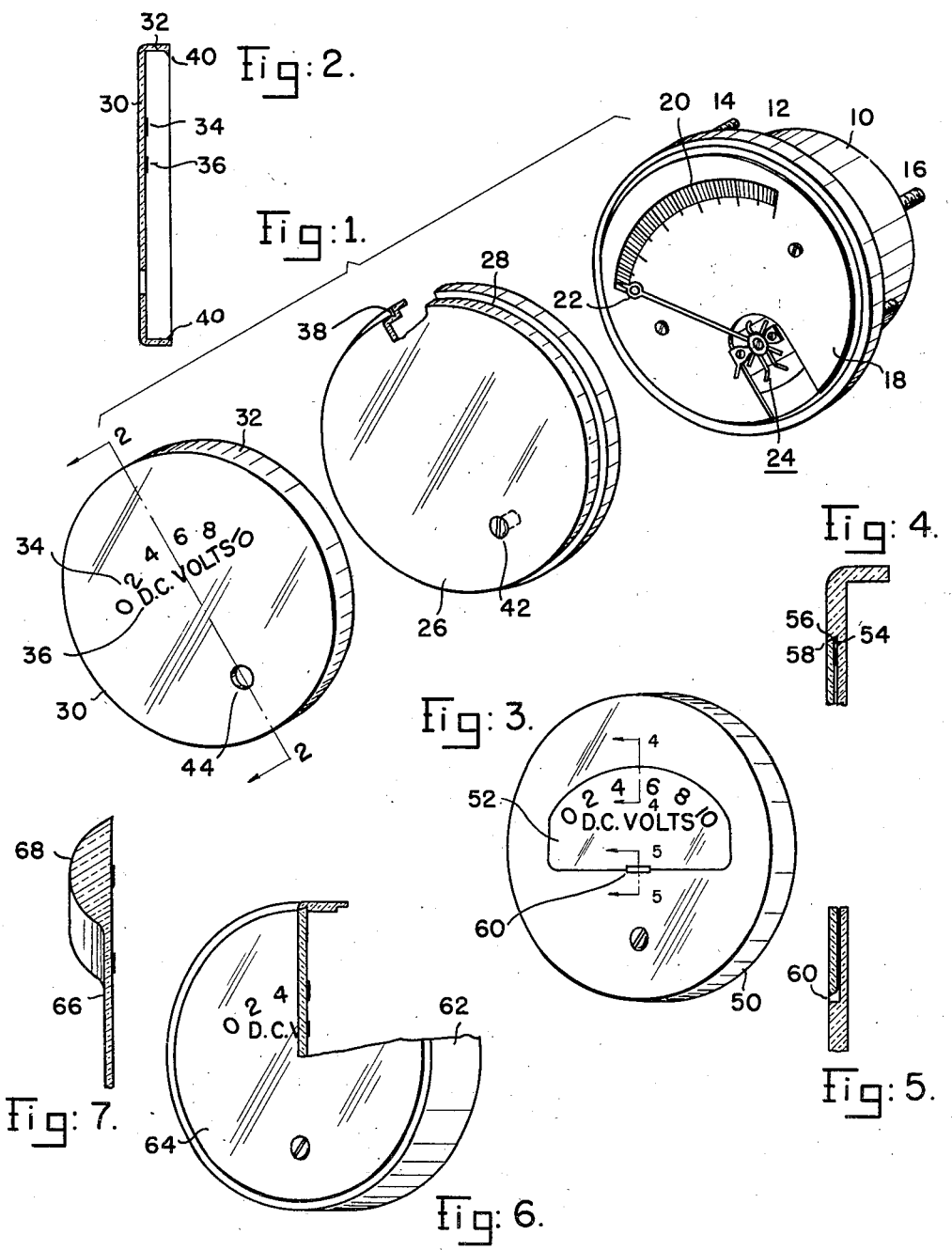
INVENTOR
WILLIAM R. TRIPLETT
BY
Toulmin & Toulmin
ATTORNEYS.

Patented Sept. 30, 1952

2,612,132

UNITED STATES PATENT OFFICE 2,612,132

INSTRUMENT COVER

William R. Triplett, Bluffton, Ohio, assignor to The Triplett Electrical Instrument Company, Bluffton, Ohio, a corporation of Ohio Application September 15, 1950, Serial No. 185,063

10 Claims. (Cl. 116—114)

This invention relates to indicating devices, such as electrical instruments, meters, and the like, and particularly to the indicating scale and indicia therefor.

In connection with most indicating instruments, which it is understood will include electrical instruments such as voltmeters, ammeters, and the like, pressure indicating devices, and other such mechanisms as are used in industry, there is generally provided a calibrated scale bearing indicia over which a movable pointer sweeps as the instrument is actuated by the stimulus applied thereto.

Heretofore when a multiple purpose instrument, such as a multiple scale voltmeter or ammeter or a voltameter was provided, the calibrated scale referred to above was either provided with multiple sets of indicia, or else multiple calibrated scales were provided, each having their own indicia.

Also, in many instances it is desired to convert an instrument from one range to another or from one type of measuring duty to another, and this generally requires that a new scale be provided. Inasmuch as such scales are generally placed directly on the dial of the instrument, replacement of the scale requires that the instrument be dismantled and the dial replaced with another.

It is an object of the present invention to provide a simple and inexpensive means of overcoming the difficulties referred to above in connection with the operation of instruments over more than one range and for more than one type of service.

Another object of this invention is to provide an arrangement whereby the calibration of the dial of an instrument can be modified without dismantling the instrument.

A still further object is to provide an instrument wherein the range of operation and the calibration of the instrument can be changed without in any way disturbing the interior of the instrument, whereby it can remain sealed against foreign substances at all times.

In general the objects of this invention are accomplished by providing the instrument with a dial having a calibrated scale therein over which the pointer of the instrument sweeps, but which calibrated scale is devoid of legends and indicia, and providing the legends and indicia on a separate transparent member that can readily be attached to or detached from the instrument in proper alignment with the calibrated scale.

In another form which my invention may take the dial of the instrument is devoid of any markings and the scale and indicia therefor and any necessary legends are applied directly to the detachable transparent member.

The foregoing objects and other objects and advantages will become more apparent upon reference to the following description taken in connection with the accompanying drawings in which:

Figure 1 is a perspective view showing an indicating instrument constructed in accordance with the teachings of this invention;

Figure 2 is a sectional view indicated by line 2—2 on Figure 1 and showing the appearance of the auxiliary cover member of this invention in section;

Figure 3 is a perspective view showing a modified form of my invention;

Figure 4 is a sectional view indicated by line 4—4 on Figure 3 showing the manner in which the main cover member and auxiliary cover member are retained together;

Figure 5 is a sectional view taken on line 5—5 of Figure 3 and showing an arrangement provided for detaching the auxiliary member from the main cover member;

Figure 6 is a perspective view partly in section of still another modified form of my invention; and Figure 7 is a fragmentary view showing a still further form which the auxiliary member of my invention may take and including a lens-shaped part for the purpose of magnifying the scale and indicia of the instrument.

Referring to the drawings somewhat more in detail, Figure 1 shows an exploded perspective view of an electrical instrument constructed according to this invention, but it will be understood that the invention obtains equally in connection with all types of indicating instruments and devices, and the electrical instrument shown is merely exemplary of one of the many uses to which my invention can be put.

In Figure 1 the instrument illustrated comprises a casing 10 having a flange 12 through which mounting studs 14 may extend for the purpose of supporting the instrument on a panel. Terminal posts may extend out the back of the instrument, as indicated at 16, for the purpose of making electrical connections to the movement of the instrument.

The casing 10 is open at one side and there is a dial 18 mounted thereover, bearing a scale 20. The scale 20 is of a conventional type, except that it is devoid of all indicia or legends. Movable along the scale is a pointer 22 secured to the movement of the instrument, which is indicated generally at 24. The instrument pointer and the interconnection thereof, biasing springs, etc., are all conventional and need not be described in detail.

The open side of the instrument case is adapted for being covered by the relatively shallow cup-like transparent cover member 26, which cover member may be secured to the instrument case in any suitable manner, as, for example, in the manner illustrated in the co-pending application Serial No. 137,950, filed January 11, 1950, in the name of William R. Triplett, and assigned to the same assignee as the present application.

In the application referred to, the cover member is secured to the periphery of the dial, which, in turn, is secured to the instrumet movement, and which, in its turn, is secured in the instrument case by the terminal studs. The particular manner of supporting the cover member on the case, however, forms no part of the present invention.

As seen in Figure 1, the cover member 26 is circular, but it will be understood that different shapes of cover members could be used, if it were desired to shape the instrument or device with which it was being used to some other shape than shown.

Extending about the periphery of cover member 26 is a ledge or shoulder 28, and there is provided an auxiliary cover member 30 having rearwardly extending flange 32 that is adapted for closely fitting about the periphery of the shouldered part 28 of cover member 26.

The length of flange 32 on the auxiliary cover member 30 abuts the outer face of the main cover member 26, and the rear edge of flange 32 abuts the shoulder about main cover member 26, whereby the two cover members when assembled present a flush surface over the entire exterior.

According to this invention, the auxiliary transparent cover member 30 bears indicia thereon, as indicated at 34, and may also bear any desirable legend, as indicated at 36. These indicia and legends may be associated with auxiliary cover member 30 in any suitable manner, such as by being appliqued thereto, by being etched therein, by being formed integrally with the cover member during molding operation, or in any other suitable manner that will provide for a permanent association of the indicia and cover member.

As illustrated, the indicia and legend are on the inner surface of the auxiliary cover member, and this has the advantage of positioning the indicia and legends in a protected location, whereby they are not easily scratched and whereby the cover of the instrument can readily be cleaned at any time without any danger of damaging the said indicia and legends.

Preferably, the two cover members are so arranged that they will be held tightly together at all times, but will be readily detachable from each other. To this end, I provide the cover members with interfitting portions, such as the notch 38 about the periphery of main cover member 26, which is adapted for engagement with lip 40 formed in the periphery of auxiliary cover member 30. This lip and notch arrangement may occur at one or more locations about the peripheries of the cover members, and not only serves as a means for holding the cover members together, but also provides a means for locating the cover members relatively, whereby the indicia on cover member 30 will always properly register with the scale 20 on dial 18.

The main cover member 26 may, of course, be provided with the usual zero adjusting screw 42, and auxiliary cover member 30 may be formed to provide access to the screw by the aperture 44.

Turning now to Figure 3, there is shown a somewhat modified arrangement wherein the main cover member is indicated at 50, and the auxiliary cover member is indicated at 52. In Figure 3 the auxiliary cover member extends over only a portion of the main cover member and is detachably secured thereto in some suitable manner, as by forming the main cover member with a recess 54 having a beveled edge 56. The outer periphery of the auxiliary cover member is then correspondingly beveled, as at 58, so that it can be snapped into position on the main cover member in much the same manner as a watch crystal is snapped into position on its bezel.

In order to facilitate the detachment of the auxiliary cover member from the main cover member, one or both of the members may be formed with a notch, as at 60, and which, as will be seen in Figures 3 and 5, provides ready means for inserting a knife blade, screw driver tip, or other suitable tool, between the cover members for snapping the auxiliary cover member out.

In Figure 6, I illustrate a still further modification, wherein the instrument case may be provided with a mounting ring 62 which may be of metal or plastic, as desired, and which forms a bezel ring into which may be snapped a transparent cover member 64 bearing indicia and legends for registration with the scale of the instrument.

In the modification of Figure 6 the advantage obtains that the calibration of the instrument scale can readily be changed at any time, merely by replacing the transparent cover member 64, but the disadvantage is present that every time the cover member is removed, the interior of the cover member is exposed.

In Figure 7 there is illustrated a still further modified arrangement wherein the auxiliary transparent member 66 bearing the indicia and legends, as indicated, is provided with a lens-shaped part 68 which serves to magnify the scale and indicia, thereby making the reading of the instrument easier. The arrangement of Figure 7 is adapted for being incorporated in any of the above described modifications.

From the foregoing, it will be seen that what I have invented is a relatively simple and inexpensive, but highly effective arrangement for providing multiple purpose instruments or instruments which can readily be converted from one use to another, at very little expense or trouble.

The invention is particularly useful in connection with electrical instruments because substantially all the movements of ammeters, voltmeters, and ohmmeters, and multiple purpose testing instruments such as are used in radio and the like, are constructed of a substantially conventional milliammeter movement, usually a movement in which one milliampere through the instrument coil will give full scale deflection, and the adaptation of this instrument to these many uses is accomplished by the use of series and parallel resistors.

It will be seen that this invention will permit an instrument movement of this type to be placed in a case with an uncalibrated scale, and to be adapted to substantially any purpose involving the measuring of a current flow without opening the instrument case merely by connecting the proper resistors or shunts to the terminal 16 and by placing the proper auxiliary cover member on the face of the instrument.

Further advantages to be had by utilizing the instrument arrangement of my invention are that the instruments may be produced in greater quantity and can be offered for sale at lower cost. Further, a distributor or large user is enabled to limit the stock of instruments which he must carry to only a few, and sometimes only one basic movement, and merely provide a relatively low cost inventory of detachable cover parts and shunts and resistors in order to adapt the instrument when a particular use is desired.

In the laboratory and in production lines the instruments may be permanently installed and may be adapted for use to substantially any circumstance on short notice. In this instance also the wide range of flexibility and adaptability of the instrument will materially reduce the number of instruments that must be carried in stock.

A material advantage in connection with my invention is that instruments having special scales or indicia thereon can readily be supplied, but the instrument at the same time has the quality of nonobsolescence because it can readily be changed to operate on another scale or be altered easily to adapt it to another type of service.

It will be evident that while I have illustrated and described in particular an arrangement where the scale of the instrument is applied to a dial plate behind the movable pointer of the instrument, the said dial plate could be free of any markings whatsoever, and not only the indicia and legends applied to the transparent member, but the scale as well, thereby making it possible to adapt the instrument to any circumstances for special applications and the like.

While this invention probably finds its greatest field of use in connection with electrical instruments, I do not intend to limit myself to that application alone, but desire to comprehend within my invention all such adaptations, modifications, and changes as may be considered to come within the spirit and scope of the appended claims.

I claim:

1. In an indicating instrument having a case with a dial on one face having a scale thereon and a pointer movable over the dial along the scale thereon; a transparent cover mounted on the said one face of the case and enclosing said dial and pointer, and a second transparent cover detachably mounted on said first cover and bearing indicia adapted to register with the scale on said dial.

2. In an indicating instrument having a case with a dial on one face having a scale thereon and a pointer movable over the dial along the scale thereon; a transparent cover mounted on the said one face of the case and enclosing said dial and pointer, and a second transparent cover detachably mounted on said first cover and bearing indicia adapted to register with the scale on said dial, and means to hold said first and second covers together in a fixed relative position.

3. In an indicating instrument having a case with a dial on one face having a scale thereon and a pointer movable over the dial along the scale thereon; a circular transparent cover member mounted on the said one face of the case and enclosing the dial and pointer, an annular ledge formed about the periphery of said cover member, and an auxiliary transparent cover member having an annular flange adapted to engage the ledge detachably to hold the said cover members together, and indicia on the inner face of said auxiliary cover member to register with said scale.

4. In an indicating instrument having a case with a dial on one face having a scale thereon and a pointer movable over the dial along the scale thereon; a shallow, cup-like transparent cover member mounted on the said one face of the case and enclosing said dial and pointer, and a second shallow, cup-like transparent member adapted to fit closely over and about the outer face of said cover member and having indicia on its inner face for registration with the calibrations of said scale.

5. In an indicating instrument having a case with a dial on one face having a scale thereon and a pointer movable over the dial along the scale thereon; a shallow, cup-like transparent cover member mounted on the said one face of the case and enclosing said dial and pointer, and a second shallow cup-like transparent member adapted to fit closely over and about the outer face of said cover member and having indicia on its inner face for registration with the calibrations of said scale, said members presenting an external flush surface when placed together.

6. In an indicating instrument having a case with a dial on one face having a scale thereon and a pointer movable over the dial along the scale thereon; a shallow, cup-like transparent cover member mounted on the said one face of the case and enclosing said dial and pointer, and a second shallow, cup-like transparent member adapted to fit closely over and about the outer face of said cover member and having indicia on its inner face for registration with the calibrations of said scale, and means comprising interfitting portions on said members to retain the said members tightly together and to predetermine a relative position thereof.

7. In an indicating instrument having a case with a dial on one face having a scale thereon and a pointer movable over the dial along the scale; a transparent cover mounted on the said one face of the case and enclosing said dial and pointer, a transparent member mounted on the face of the cover over at least the area of the dial bearing the scale and having indicia on its inner face to register with said scale, and interfitting parts on the cover and member detachably to retain the member in a predetermined position on the cover.

8. In an indicating instrument having a case with a dial on one face having a scale thereon and a pointer movable over the dial along the scale; a transparent cover mounted on the said one face of the case and enclosing said dial and pointer, a recess in the face of the cover over the area of the dial bearing the scale, and a transparent member adapted for being detachably retained in said recess and bearing indicia on its inner face to register with said dial.

9. In an indicating instrument having a case with a dial on one face having a scale thereon and a pointer movable over the dial along the scale; a transparent cover mounted on the said one face of the case and enclosing said dial and pointer, a recess in the face of the cover over the area of the dial bearing the scale, and a transparent member adapted for being detachably retained in said recess and bearing indicia on its inner face to register with said dial, said member and cover presenting a substantially flush surface when assembled.

10. A cover for an indicating instrument having an indicia free scale and a pointer movable along the scale comprising a two-part assembly, one part being adapted for directly mounting on the instrument, and the other part being detachably mounted on the said one part and bearing indicia to register with the scale of the instrument.

WILLIAM R. TRIPLETT.

REFERENCES CITED

The following references are of record in the file of this patent:

UNITED STATES PATENTS

| Number | Name | Date |
| --- | --- | --- |
| 2,285,658 | Hitchcock | June 9, 1942 |
| 2,528,640 | Coleman | Nov. 7, 1950 |